Figure 1:
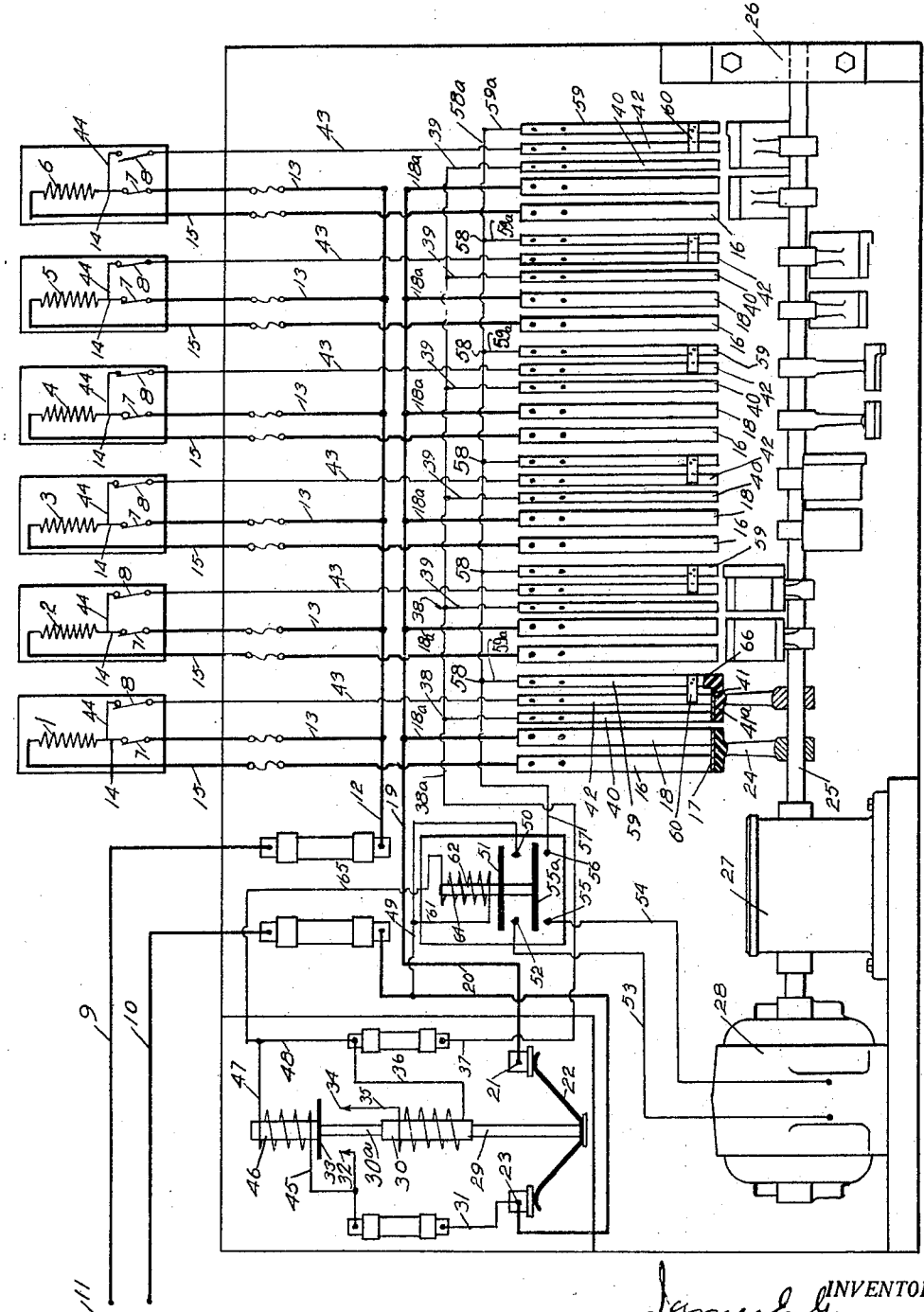

July 26, 1932.　　J. E. GANNON ET AL　　1,868,700
ELECTRIC CONTROL APPARATUS
Filed Aug. 26, 1929　　2 Sheets-Sheet 1

INVENTORS
James E. Gannon
BY Joseph M. Winter
ATTORNEYS.

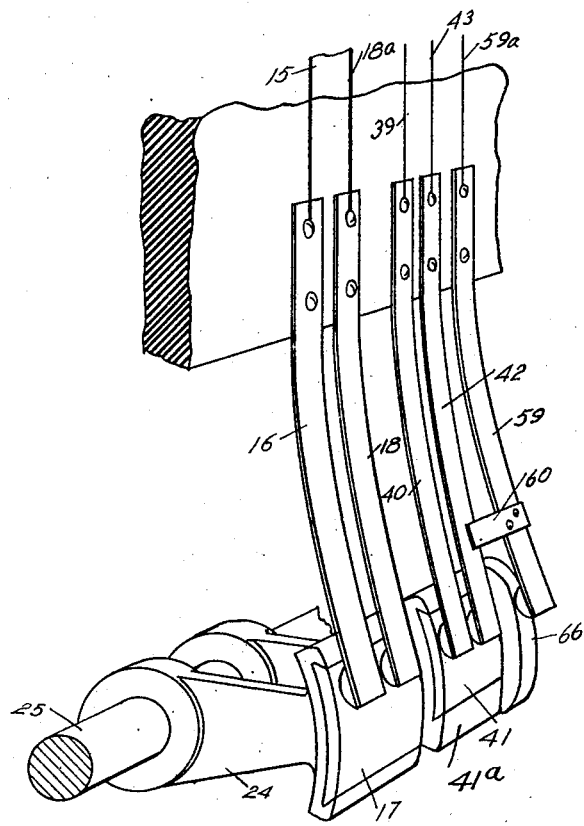
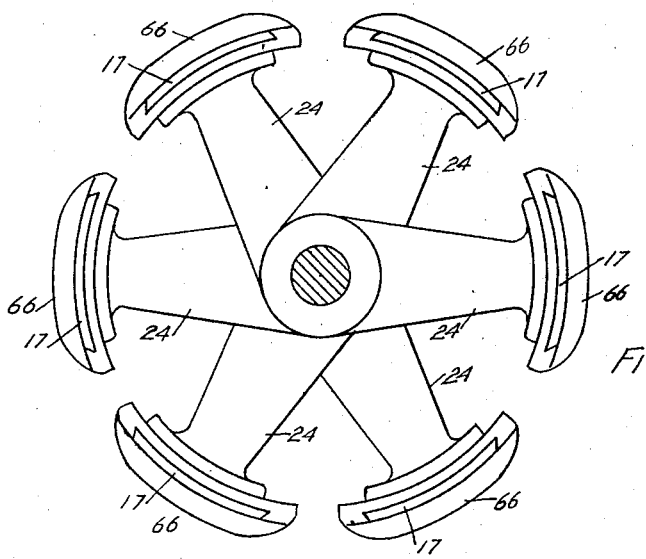

Patented July 26, 1932

1,868,700

UNITED STATES PATENT OFFICE

JAMES E. GANNON AND JOSEPH M. WINTER, OF ERIE, PENNSYLVANIA, ASSIGNORS TO AMERICAN ELECTRIC HEATING COMPANY, OF ERIE, PENNSYLVANIA, A CORPORATION OF PENNSYLVANIA

ELECTRIC CONTROL APPARATUS

Application filed August 26, 1929. Serial No. 388,399.

In the use of electricity where there are a plurality of units it is often desirable to maintain a low current consumption by automatically limiting the current flow to less than the total number of units. This is particularly true in the use of electricity for heating dwellings. Ordinarily under such conditions various rooms of the dwelling are furnished with radiators, or heating units. The current consumption with all these units drawing on the supply at once is comparatively large and this involves large conductors, and larger connections, and all the expense that these entail and also usually in many instances a higher rate for current based somewhat on the relation between the peak consumption and the total consumption. With the present invention, the units are used one at a time and this control is automatic. In a prior application, filed Aug. 13th, 1928, Ser. No. 299,286 there is disclosed an apparatus accomplishing in a general way these purposes. The present invention is intended to improve that apparatus simplifying the same in the number of control switches and also in the functioning of the device in that with this device after a unit has responded to the desired extent the apparatus without pause passes on to the next unit requiring current even though the next unit may not be the next in sequence whereas in the prior apparatus there was a step by step movement from one unit to another under all conditions. Features and details of the invention will appear from the specification and claims.

A preferred embodiment of the invention is illustrated in the accompanying drawings as follows:—

Fig. 1 shows a diagrammatical view of the apparatus.

Fig. 2 a perspective view of a set of control brushes.

Fig. 3 an end view of the motor-driven connector plates.

Heating units, such as radiators 1, 2, 3, 4, 5, and 6 are disclosed although it will be understood that a greater or less number of these units may be used. Each of these units has a thermal control 7 which is responsive to the temperature of the heating unit itself and a thermal control 8 which is responsive to the room temperature, or whatever is to be heated by the unit. In room practice, ordinarily these heating units are arranged in radiators.

Current is supplied through line wires 9 and 10 controlled by a manually actuated switch 11.

The line wire 9 is connected with a bus-bar 12 and the bus-bar 12 is connected by a line 13 to the thermostat 7 and extends from the thermostat 7 by a wire 14 to the heating unit and then leads from the heating unit by a wire 15 to a brush 16. The brush operates on a plate 17 connecting the brush 16 with a brush 18 and a wire 18a with a bus-bar 19. The bus-bar is connected by a wire 20 with a terminal 21 forming the line wire switch of a voltage release switch. A contact element 22 of the switch connects the terminal 21 with a terminal 23 and the line wire 10 is connected with this terminal. It will be understood that the bus-bars 12 and 19 are connected similarly with each of the heating elements 2, 3, 4, 5 and 6.

The plate 17 is carried by an arm 24. The arm 24 is mounted on a shaft 25. The shaft 25 is mounted in bearings 26 and is connected at the opposite end with a speed-reducing mechanism 27. The shaft is driven through this speed-reducing mechanism from a motor 28. Under the control of the apparatus the motor advances from one system of brushes to another depending on the unit to receive current.

The main switch 22 is actuated through a stem 29 by a solenoid 30. The solenoid receives current through the following circuit: Wire 31 leads from the terminal 23 to a contact 32 of an opening switch. A connecter 33 connects the contact 32 with a contact 34. A wire 35 leads from the contact 34 to the coil of the solenoid and thence by a wire 36 to a wire 37. The wire 37 leads to a post 38 which is arranged in a bus-bar 38a. A wire 39 leads from the bus-bar 38a to a brush 40. The brush 40 is connected through a connector plate 41 with a brush-bar 42. The brush-bar 42 is connected by a wire 43 through the thermostat 8 and wire 44 with the line wire 14 which, through the connections heretofore described, lead to the supply wire 9. The opening switch of the no voltage release has its connector actuated by a solenoid 46 connected by a wire 45 with the wire 31 and by a wire 47 to a wire 48, the wire 48 leading to the wire 37 from which the circuit may be traced as heretofore to the bus-bar 38a, post 38, brush 40, connecting plate 41, brush 42, wires 43 and 44 back to the line wire 9. So long as this circuit is open the opening switch with its connector 33 is held open. The operation of these parts will be hereinafter described.

A motor controlling switch is provided to put in circuit the different heating units and this is accomplished by bringing in different sets of brushes connecting the system with said units. The motor controlling switch receives its current through a wire 49 leading from the wire 10. This wire leads to a switch contact 50. A switch plate 51 connects the contact 50 with a contact 52. A wire 53 leads from the contact 52 to the motor 28 and a return wire 54 for the motor leads to a switch contact post 55. A connector plate 55a connects the contact 55 with a contact 56. A wire 57 leads from the contact 56 to a bus-bar 58a and is carried from a post 58 on the bus-bar by a wire 59a to a brush-bar 59. A bridge plate 60 connects the bar 59 with the brush 42. The wire 43 connects the brush 42 through the thermostat 8, wire 44 with the wire 14 and thence to the line wire 9 through the connection heretofore described. The switch plates 51 and 55a are carried by an active element 64 of a solenoid 62. The solenoid receives current by way of a wire 61 leading from the wire 49 which leads to the coil of the solenoid. A wire 65 leads from this coil to the wire 48 and thence through the circuit heretofore traced, wire 37, bus-bar 38a, contact 38, brush 40, connector plate 41, brush 42, wire 43, thermal switch 8, wire 44 to the line wire extension 14.

With these different lines and control switches so arranged the operation of the device may be understood as follows: It will be understood that with the parts at rest and with the lines dead the switch 22 is open, the connector plate 33 rests on the contacts 32 and 34 in the manner of the ordinary no voltage release, this being a standard piece of electrical equipment. It will also be understood that the connector plates 51 and 55a are dropped by gravity so as to close the connection between the contacts 50 and 52 and 56 and 55 respectively. Immediately, however, upon the closing of the controlling switch 11 current operating on the solenoid 30 closes the main switch to the position shown in Fig. 1, and lifts the connector plate 33 of the opening switch, thus cutting off the current from the solenoid. In the ordinary no voltage switch there is a mechanical lock locking the main switch in closed position so long as the opening switch with its plate 33 remains in its open position and the main switch is released and opened only with the dropping, or closing of the opening switch at 33. Such a mechanical device is not shown but is ordinarily well understood in structures of this type. Any ordinary contactor may be used which responds to voltage changes as where the circuit is broken. We have indicated a connection rod 30a which connects the movable element of the solenoid 46 with the movable element of the solenoid 30 which provides an operative mechanically actuated structure. With this closing of the switch, assuming that the thermal switches 7 and 8 are closed, in as much as the heating unit is cold and presumably the room also, current passes through the heating unit 1 with the connector plates 17 and 41 in the position shown in Fig. 1. It will also be understood that immediately upon the closing of the switch 11 current is carried into the solenoid 62 and the switch plates 51 and 55 are lifted, thus breaking the connection to the motor and leaving the motor in its initial position. The condition, therefore, continues with current through the initial heating unit with the parts in the position shown in Fig. 1, until one of the thermal switches 7, or 8 is opened. Ordinarily this would be the thermal switch 7 which responds to the heat of the heating unit, in as much as this will be brought to its desired maximum temperature long before the room would reach its desired temperature. As soon as one of the thermally controlled switches 7, or 8 is opened the circuit through both the solenoid 46 and the solenoid 62 is cut off, as will be evident in tracing the circuits as heretofore indicated as both these solenoids have in their circuits the wire 43 and the wire 13. Instantly, therefore, with the opening of the switches 7, or 8, the connector plate 33 drops releasing the mechanically actuated device for holding the switch 22 in closed position and also drops the connector plates 51 and 55a, thus closing the circuit closing the motor circuit. The motor then immediately advances and continues to advance until the connector plates 17 and 41 are brought under the next set of brushes. If the thermal switches 7 and 8 connected with this next set of brushes, as for instance, the unit 2 are closed, then immediately the circuits through the solenoids 30, 46 and 51 are closed and the main switch is closed to the unit and the motor switch is opened, where the same condition is continued. By opening the main switch as each of the selector units on the shaft 25 close their circuits arcing is prevented. On the reverse of this the circuits are opened by the thermal switches and arcing at the opening of these selectors is thus avoided.

It is necessary in order to open the circuit to disconnect the brush 42 from the bar 59 in the system on which the connector plates are operating. For this reason an insulated lift cam 56 is arranged on the arm 41a and lifts the bar 59 of the system which is engaged by the connector plates 17 and 41. That this breaking of the connection is necessary will be apparent if we trace the current, as for instance, for the motor controlling coil. Without such a break current might pass by the wire 49, wire 61, coil 62, wire 65, wire 48, wire 37, bus-bar 38a, and post 38 connected with the brush-bar system of unit 1. Current would then pass from the post 38 of this unit, wire 39, bar 40, connector plate 41, brush 42, bridge 60, brush 59, lead 59a, post 58 of unit 1, bus-bar 58a, post 58, of unit 2, lead 59a, brush 59, connector 60, brush 42, wire 43 and thence by switch 8, wire 44 to the extension 14 of the line wire 9. By breaking the connection at the bridge 60 of the bar immediately in the system operating on the connector plates 17 and 41 this result is obviated. It will be seen, therefore, that in this structure the apparatus as a whole is controlled with a single no voltage releasing switch and motor switch for the entire system whereas in the application above referred to a releasing switch was necessary for each heating unit.

It will be noted also that when the motor starts, if the second unit has the thermal switches 7, or 8 open, there will be no circuit established through the solenoid 62 and consequently the motor controlling switch will remain closed and the motor will continue to a unit which requires current. On the other hand, if all of the thermal units 7 and 8 are opened at the moment that the thermal units 7 or 8 in the first unit are opened, there will be no movement of the motor because there will be no line current through the line wire extensions controlled by the thermal unit 7 and as this thermal switch operates more frequently than the room controlling switches the apparatus will be stopped and remain at rest as soon as the room temperatures reach the desired temperature.

What is claimed as new is:—

1. In an electric control apparatus, the combination of a plurality of heating units; electric circuits for said units; a main switch common to the circuits; means responsive to conditions at the units selecting said circuits one at a time through the main switch; and devices actuating the main switch with each selection whereby arcing is prevented at the point of selection.

2. In an electric control apparatus, the combination of a plurality of heating units; electric circuits for said units; a main switch common to the circuits; means responsive to conditions at the units selecting said circuits one at a time through the main switch; and devices actuating the main switch with each selection, said selecting means acting in advance of the main switch in closing the circuit whereby arcing is prevented at the point of selection.

3. In an electric control apparatus, the combination of a plurality of heating units; electric circuits for said units; a main switch common to the circuits; means responsive to thermal conditions at the units selecting said circuits one at a time through the main switch; and devices actuating the main switch with each selection whereby arcing is prevented at the point of selection.

4. In an electric control apparatus, the combination of a plurality of heating units; electric circuits for said units; a main switch common to the circuits; means responsive to thermal conditions of the units selecting said circuits one at a time through the main switch; and devices actuating the main switch with each selection whereby arcing is prevented at the point of selection.

5. In an electric control apparatus, the combination of a plurality of heating units; electric circuits for said units; a main switch common to the circuits; means responsive to thermal conditions of the medium acted upon by the units selecting said circuits one at a time through the main switch; and devices actuating the main switch with each selection whereby arcing is prevented at the point of selection.

6. In an electric control apparatus, the combination of a plurality of heating units; electric circuits for said units; a main switch common to the circuits; means responsive to thermal conditions of the units and the medium acted upon by the units selecting said circuits one at a time through the main switch; and devices actuating the main switch with each selection.

7. In an electric control apparatus, the combination of a plurality of heating units; circuits for said units; a main switch common to the circuits; a motor; a motor controlling switch; a selecting medium actuated by the motor throwing in one at a time one of said circuits through said main switch; and devices responsive to conditions at the units controlling the motor controlling switch and with it the motor to actuate the means to select one at a time a circuit through the main switch, said main switch acting in response to said devices.

8. In an electric control apparatus, the combination of a plurality of heating units; circuits for said units; a main switch common to the circuits; a motor; a motor controlling switch; a selecting medium actuated by the motor throwing in one at a time one of said circuits through said main switch; and devices responsive to conditions at the units controlling the motor controlling switch and with it the motor to actuate the means to select one at a time a circuit through the main switch, said main switch acting in response to said devices following the action of the selecting device.

9. In an electric control apparatus, the combination of a plurality of heating units; circuits for said units; a no voltage responsive main switch; a motor; a selecting means actuated by the motor; a motor controlling switch; and thermal switches at the units controlling the no voltage release of the main switch and the motor controlling switch to change the selection of circuits through the main switch in response to conditions acting on the thermal switches.

10. In an electric control apparatus, the combination of a plurality of electric heating units; a supply circuit leading to each unit; a control circuit leading to each unit; a motor circuit; a motor in the motor circuit; a main switch controlling the supply circuit; a motor controlling switch in the motor circuit; a selecting device for each unit comprising two brushes and a connecting plate for the supply circuit, two brushes and a connecting plate for the control circuit, and an auxiliary brush connecting the motor circuit and the control circuit through the control circuit brushes, said brush being connected with the control circuit brushes in unselected units and disconnected from the control brushes in selected units; means actuated by the motor selecting brushes of the different units and throwing out the connecting brush in the selected unit; and means responsive to conditions at the units controlling the control circuits.

In testimony whereof we have hereunto set our hands.

JAMES E. GANNON.
JOSEPH M. WINTER.